Figure 1:
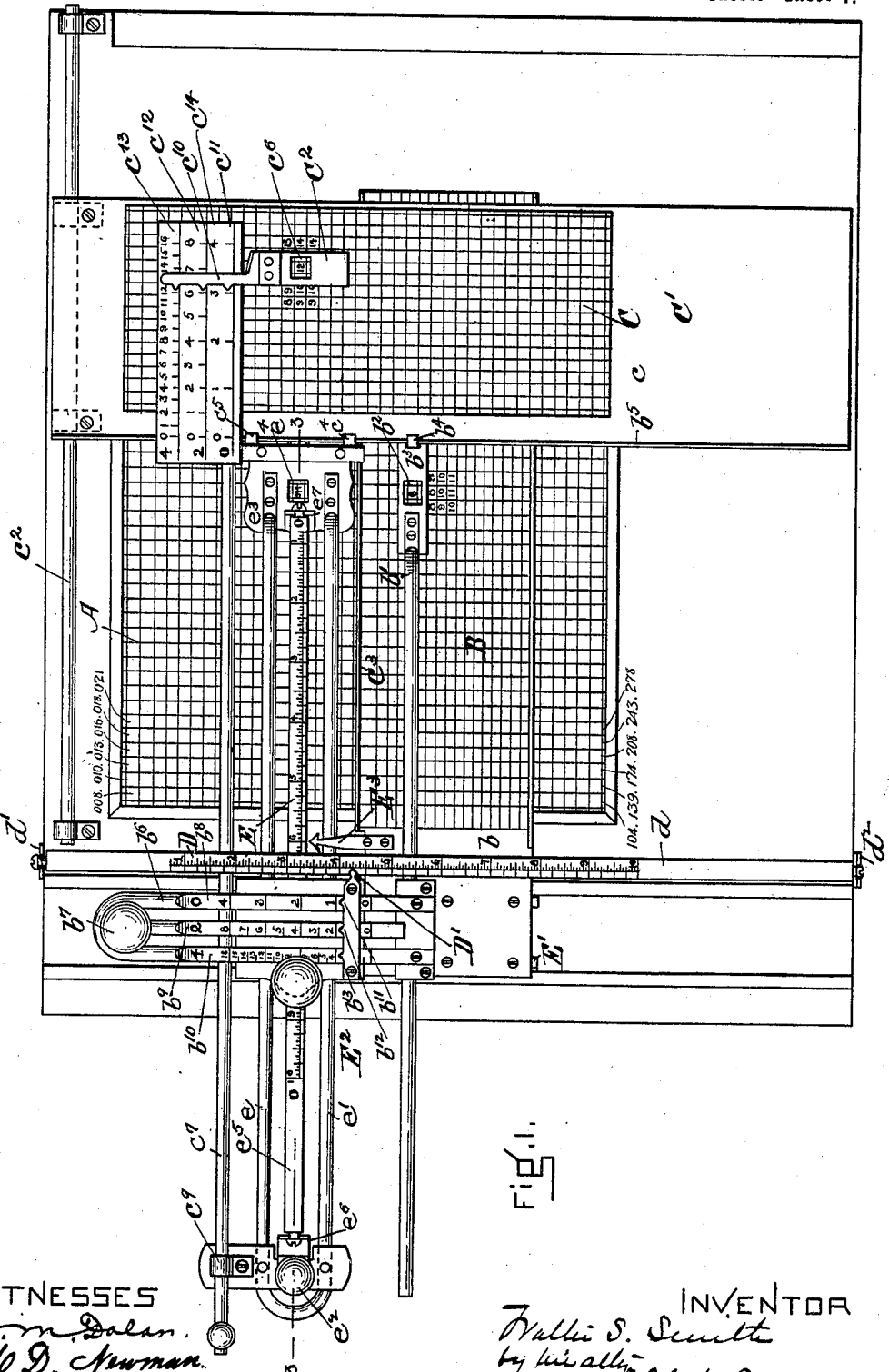

No. 655,027. Patented July 31, 1900.
W. S. SMITH.
COMPUTING DEVICE.
(Application filed Nov. 18, 1899.)
(No Model.) 3 Sheets—Sheet 1.

No. 655,027. Patented July 31, 1900.
W. S. SMITH.
COMPUTING DEVICE.
(Application filed Nov. 18, 1899.)
(No Model.) 3 Sheets—Sheet 2.
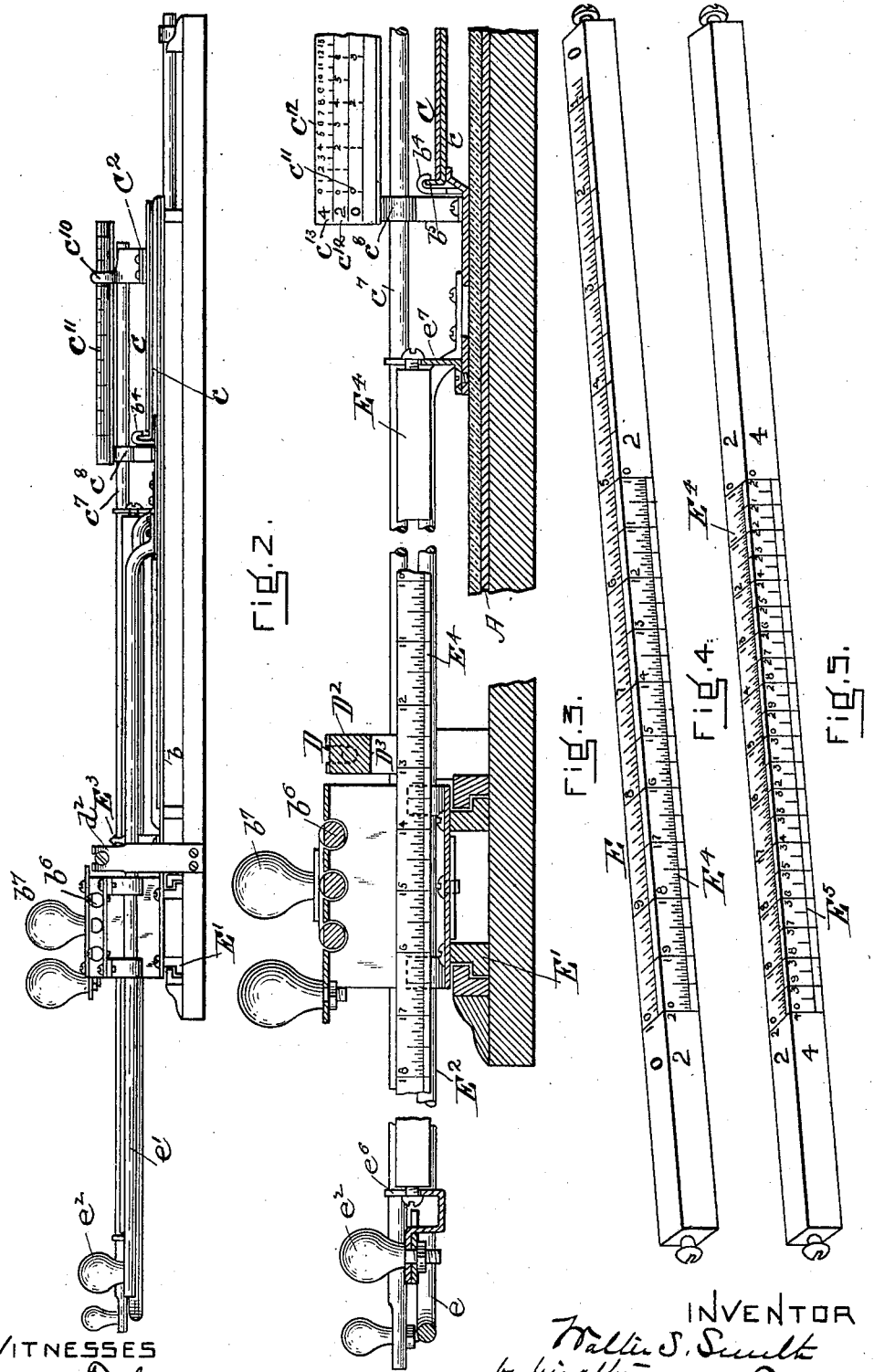

No. 655,027. Patented July 31, 1900.
W. S. SMITH.
COMPUTING DEVICE.
(Application filed Nov. 18, 1899.)
(No Model.) 3 Sheets—Sheet 3.
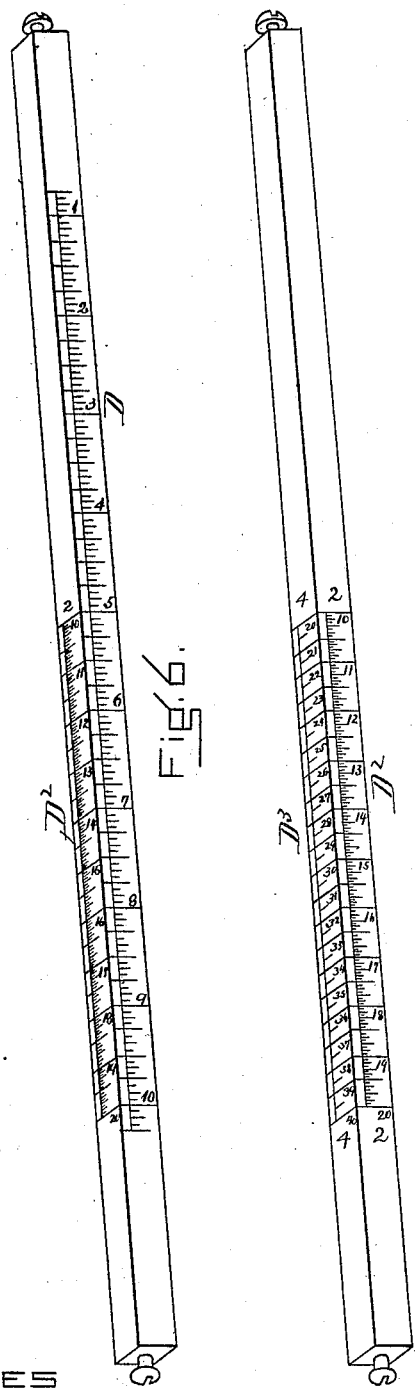
WITNESSES
INVENTOR

UNITED STATES PATENT OFFICE.

WALTER S. SMITH, OF BROOKLINE, MASSACHUSETTS.

COMPUTING DEVICE.

SPECIFICATION forming part of Letters Patent No. 655,027, dated July 31, 1900.

Application filed November 18, 1899. Serial No. 737,388. (No model.)

*To all whom it may concern:*

Be it known that I, WALTER S. SMITH, a citizen of the United States, residing at Brookline, in the county of Norfolk and State of Massachusetts, have invented a new and useful Improvement in Computing Devices, of which the following is a full, clear, and exact description, reference being had to the accompanying drawings, forming a part of this specification, in explaining its nature.

The invention relates especially to means for computing square contents or areas. It is represented as applied to a device used for obtaining the number of square feet in boards or material of boxes; but I would not be understood as limiting the invention to such use.

In the drawings, Figure 1 is a view in plan of the computing device. Fig. 2 is a view in elevation thereof looking from the front. Fig. 3 is a view in section upon the dotted line 3 3 of Fig. 1 and in elevation of parts back of said line. Figs. 4 and 5 are views in perspective representing a rotary scale-beam, to which reference will hereinafter be made. Figs. 6 and 7 are views in perspective representing a rotary scale-beam used in connection with the one shown in Figs. 4 and 5.

The device comprises a stationary main table A, which has arranged in parallel lines and columns certain computations. The computations which are used for the device of the drawings are those necessary for obtaining the product in feet of the square area of the two parts of a box opposite each other, of which in a box there are three sets—namely, the top and the bottom, the two ends, and the two sides. The table is represented as arranged to measure a surface not less than three-fourths of an inch square, as this represents the smallest size of wooden box which it is desirable to measure, and the main table is computed to give any measurement in square feet of any dimensions in quarter-inches from three-fourths of an inch to forty inches. The main table so computed need not be included in full here; but for the purposes of illustration I will give a portion of the computations of the first line, beginning with the first column, and of the last line, beginning with the first column:

First line: .008 .010 .013 .016 .018 .021

Last line: .104 .139 .174 .208 .243 .278

The table altogether has thirteen hundred and sixty-nine different computations, as there are thirty-seven lines and thirty-seven columns, making thirteen hundred and sixty-nine spaces. It should be understood that these computations are twice the product of the square area measured. As the computations of this main table are limited to dimensions varying a quarter of an inch it is necessary that there be provision for ascertaining the square area of the intermediate fractions between quarter-of-an-inch measurements, and for this purpose there are used two additional tables, which I have termed "interpolating-tables." B represents one of these tables and C the other. For convenience these tables are made movable, as will hereinafter be described. These interpolating-tables are arranged to provide the measurement or square area of any desired fraction of an inch less than a quarter of an inch. I have represented them as arranged to give the square area in sixteenths of an inch. The main table is calculated for measurements from three-fourths of an inch to ten inches. The supplemental tables are calculated for measurements between three-fourths of an inch and forty inches. They could all be included in one table, if desired; but such a table would be so large that I have found it expedient to use the table having computations from three-fourths of an inch to ten inches and to obtain the enlargements of measurements to forty inches by means of different or multiplying-scales preferably arranged upon a common support with the normal scale and adapted to be brought into a position for use by turning the same.

I will now describe the use of the tables, in connection with the scales, for measuring any surface between three-fourths of an inch and ten inches and also the devices for finding, ascertaining, or selecting by means of these scales and accessory devices the particular computations desired from the tables. D represents one of the scales employed in ascertaining a measurement, and E the other.

The first scale is stationary and is preferably arranged at one side of the main table. The second is mounted upon a slide E', which is movable parallel with and lengthwise of the scale D at one side thereof, and in this slide the scale E is mounted by means of a slide E², movable crosswise it across the line-scale D and preferably below it. The slide E² consists of two long rods $e\ e'$, connected at their ends and passing through suitable holding-bearings carried by the slide E'. At the outer end of the slide is a knob or handle $e^2$, by which it may be moved. At the inner end is the connecting-plate $e^3$, in which is a sight-hole $e^4$, through which a measurement of the table may be read when the sight-hole has been moved to the position over the table fixed by predetermined numbers on the two scales D and E in conjunction with the pointers D' and E³. The scale D is divided into quarter-inches, beginning at three-fourths of an inch. The scale E is a duplicate, excepting that the quarter-inch measurements of the scale D are more closely arranged than those of the scale E, as the column-spaces of the table are longer than they are wide in order that they may receive a computation indicated by three or four figures.

I will now describe the operation of the scales D and E in connection with the main table A and in conjunction with dimensions which can be ascertained by that table alone. Suppose it necessary to obtain the square area of the top and bottom of a box six and one-fourth inches long by five and one-fourth inches wide. The slide E', carrying the pointer D', will be moved along the scale D until the pointer is brought opposite "$5\frac{1}{4}$," which indicates the width of the box or measurement. The scale E will then be moved crosswise the scale D' and until "$6\frac{1}{4}$" is indicated against the pointer E³. These combined movements of the slide E' and of the scale E will bring the sight-hole $e^4$ over the square containing the measurement which it is desired to read from the table, and the measurement in this case would read ".457" and would be the square area in feet of two sections of a box each six and one-fourth inches long and five and one-fourth inches wide. One of these sections would measure one-half of this amount.

Scales D and E are adapted to be used in obtaining square areas between three-fourths of an inch and ten inches in length in quarters. In order that areas of larger dimensions may be measured by the same instrument, I employ the additional scales D² and D³, either of which may be used as a substitute for the scale D and may be moved into the position which it occupies. I have numbered these various scales "0," "2," and "4," and that they may be brought to the same place for use I have mounted them upon a rotary supporting-rod $d$, square in cross-section, having flat surfaces and carried at its ends in the stationary brackets $d'$ and $d^2$ in a manner to permit of the turning of the rod to bring one or another of the scales uppermost to an exposed position and where it can be employed in conjunction with pointer D'. The scale D² is used in measuring dimensions between ten and twenty inches, and the scale D³ dimensions between twenty and forty inches. The scale D measures in quarter-inches, the scale D² (No. 2) measures in half-inches, and the scale D³ (No. 4) in whole inches. (See Figs. 6 and 7.) The reason for this will be given later. The scale E is mounted upon the rod $e^5$, which is supported by brackets $e^6\ e^7$, in a manner to be turned thereon, and it also has the additional scales E⁴ E⁵, either of which is adapted to be substituted for the scale E upon the turning of the support. These scales are divided into half-inches and inches, as are the corresponding scales D² D³, (see Figs. 4 and 5,) and for the same reason. The scales D², D³, E⁴, and E⁵ are used in computing measurements exceeding ten inches and twenty inches, respectively, and when employed in conjunction with the main table only are limited to the measurement of dimensions in half-inches and in inches, respectively. In order to get the indicating-number in square feet when the scales D² E⁴ are used, the number indicated by the sight-hole must be multiplied by four. When the scales D¹ E⁵ are used, the table-number must be multiplied by sixteen. It is, however, possible to use either of the scales D D² D³ with either of the scales E E⁴ E⁵, according to the dimensions of the board or thing which is to be measured. The indicated product, however, must then be multiplied according to the ratio which one scale bears to the other. For instance, D scale used with E⁴ scale would require that the product be multiplied twice; used with E⁵ scale would require that the product be multiplied four times. D² scale used with E scale would require that the product be multiplied twice; used with E⁴ scale would require that the product be multiplied four times; used with E⁵ scale would require that the product be multiplied eight times, and so on.

So far I have described the construction and operation of the device where the dimensions have not contained a smaller fraction than a quarter-inch, a half-inch, or an inch, according to the scales used.

Dimensions including fractions of inches between quarters, such as eighths and sixteenths on scales D and E, quarters, eighths, and sixteenths on scales D² E⁴, and halves, quarters, eighths, and sixteenths on scales D¹ E⁵, require for the ascertainment of their product the use of the interpolating-tables B and C, or one of them. These supplemental tables do not indicate the product by multiplication of any dimensions, but represent divisions of differences between contiguous products in the lines and columns of the main table, and the products found by them are added to the product found on the main table and multiplied with said product, if required.

I will first describe the construction of the supplemental tables and devices used with them and will then illustrate the manner in which they are employed.

The supplemental table B is mounted upon a flat bed or support $b$, which is attached to the slide E', to be movable up and down the main table. There is used upon it the finder $b'$, which has a sight-hole $b^2$ in the plate $b^3$. This plate is moved both up and down and laterally upon the table B. It is moved laterally by means of the cross-slide $E^2$, to which it is indirectly connected by a sliding connection $b^4$, which slides upon the rail $b^5$ on the edge of the bed $c$, supporting the table C. It is moved up and down by means of the slide $b^6$, mounted upon the upper portion of the slide E', the slide $b^6$ being moved by a handle $b^7$. The slide has upon it the three scales $b^8$, $b^9$, and $b^{10}$. The first is used in conjunction with the scale D, the second in conjunction with the scale $D^2$, and the third in conjunction with the scale $D^3$. There is a pointer or indicator for each scale mounted upon the slide E', the pointer $b^{11}$ coöperating with the scale $b^8$, the pointer $b^{12}$ with the scale $b^9$, the pointer $b^{13}$ with the scale $b^{10}$. These pointers provide means whereby the finder may be adjusted over the table to any position indicated by the governing dimensions.

The table C is carried by a support or bed C'. It is mounted upon lateral supports $c^2$ $c^3$. The first is a rod along the upper edge of the main table, and the second is a rail at the upper edge of the bed $b$. The table and bed are connected with the slide $E^2$, whereby upon the movement of the slide across the main table it is moved with it, the connection between the bed C' and the slide $E^2$ being such that the slide may move up and down with respect to the bed without moving the bed in such directions, this connection being obtained by means of the sliding guides $c^4$ $c^5$, which slide upon the rail $b^5$. $C^2$ is the finder used with this table. It has the sight-hole $c^6$ and is movable both lengthwise and crosswise by means of the rod $c^7$, mounted at $c^8$ $c^9$ on the slide $E^2$ to be movable laterally, independently of said slide, while it is also moved up and down the table with said slide. The pointer $c^{10}$ is attached to the finder and is movable over the scales $c^{11}$ $c^{12}$ $c^{13}$ on the support $c^{14}$, attached to the slide $E^2$, to be movable up and down over the table C. The scale $c^{11}$ is used in conjunction with the scale E, the scale $c^{12}$ in conjunction with the scale $E^4$, and the scale $c^{13}$ in conjunction with the scale $E^5$. The tables B and C are arranged closely to the sight-hole $e^4$ of the main finder and are continued in close relation to it as it is moved, and this insures that the finders of the supplemental tables shall also be maintained in close relationship to the sight-hole $e^4$ of the main finder. This is for the purpose of bringing the three finders into the same focus or into close relationship with each other and to maintain them in such relationship that the eye shall be obliged to make but a slight movement, if any, in reading the various products from the three tables.

I will now illustrate the manner in which the supplemental tables are used, and I will select for measurement the two sides of a box the measurements of which are six and three-sixteenths inches long by four and five-sixteenths inches deep. The main scales D and E will be used. The scale E will be moved until indicating-line 6 is brought against the pointer $E^3$. The product of the remaining three-sixteenths of an inch of this dimension will be obtained from the table C and will be found by moving the pointer $c^{10}$ to the figure "3" on the scale $c^{11}$. The slide E' will then be moved to bring its pointer opposite the "$4\frac{1}{4}$" of the scale D, and the product of the remaining one-sixteenth of an inch will be ascertained from the table B, the slide $b^6$ being then moved until the figure "1" of the scale $b^8$ is brought against the pointer $b^{11}$. The main and the two supplemental tables are then read through the sight-holes. The main table will read ".344," the table C "12," and the table B "6." As twelve and six are respectively twelve one-thousandths and six one-thousandths, they are so added to the ".344," making for the product in square feet of the two sides of the box .352 of a square foot. The device in the drawings is set to show this result, or as the scales would be moved or adjusted for the purpose of ascertaining the area in square feet of the sides of a box which measures six and three-sixteenths inches long by four and five-sixteenths inches deep. It will be understood that the finders of the supplemental tables are to be governed by the main scale, which is being used in obtaining the product, and it is for this reason that three supplemental scales are provided for each finder, one being used in conjunction with each main scale. It will be understood that all these supplemental scales measure sixteenths of an inch. The scales used in conjunction with the main scales D and E measure four-sixteenths of an inch, that being the distance between two quarter inches, the scales used in conjunction with the main scales $D^2$ $E^4$ measuring eight-sixteenths of an inch, that being the distance between two half-inches of the main scale, and the scales used in connection with the scales $D^3$ and $E^5$ measuring sixteen-sixteenths, that being the distance between the two successive inches of the said scales.

It should be understood that the main table is an arbitrary production of computations and that the auxiliary tables are prepared, as above described, from these computations; also, that the main indicating-scales bear upon them in inches and fractions of an inch the numbers which have been multiplied together to produce the computations of the tables and that where these numbers are limited to fractions of an inch relatively large smaller fractions are obtained by means of the interpolated scales and tables above specified. It should also be understood that the capacity of the main table is increased by the means of extensions of the main scales and that such extensions are preferably mounted upon the supports for the main scales and in a manner to be readily substituted for them and to occupy their places, and that when they are used the products of the main table must be correspondingly multiplied to obtain the desired result. The computations of the main table may be the product in square feet or fractions thereof of two dimensions or may be any desired number of times such product, according to the number of pieces of the same size which it is desired to obtain the square area of. In use the main scales are moved with respect to their pointers, or vice versa, until the pointers indicate on the main scales the dimension of the piece of which it is desired to obtain the area thereof in square feet. This will cause the finder with its sight-hole to be located over one of the squares or boxes of the table and the figures inclosed in that square or box will be the square area of a piece of said dimensions or of two pieces of said dimensions in case, for instance, the device is applied to the measurement of the sides of boxes. This movement of the finder will also cause the auxiliary finders to be moved to the horizontal line, on which they are subsequently moved to find any additional products not included in the main table.

Having thus fully described my invention, I claim and desire to secure by Letters Patent of the United States—

1. In a computing device the combination of a single stationary table of computations, arranged in regular order in lines and columns, two main indicating-scales, one of which is arranged at one end of the table and is stationary, and the other of which is movable lengthwise the first-named scale and also crosswise it, lengthwise of the table and upon a right-angular line with respect to the fixed scale, and a product-finder movable with the movable scale over the table to a position which indicates in the table the product of two predetermined measurements.

2. In a computing device the combination of a table of computations arranged in regular order in lines and columns, two main indicating-scales, one of which is at a right angle to the other and movable with respect to the other, a product-finder movable over said table to a position determined by the movement of said indicating-scales and which position indicates in the table the product of two predetermined measurements, or a multiple thereof, and auxiliary tables prepared from said table of computations and an auxiliary scale and product finder for each auxiliary table.

3. In a computing device the combination of a table of computations arranged in regular order in lines and columns, two main indicating-scales, one of which is at a right angle to the other and movable with respect to the other, a product-finder movable over said table to a position determined by the movement of said indicating-scales and which position indicates in the table the product of two predetermined measurements, or a multiple thereof, auxiliary tables prepared from said table of computations movable with respect to the said table and to each other and a scale and product finder for each auxiliary table.

4. In a computing device the combination of a single stationary table of computations, arranged in regular order in lines and columns, two series of independent, main, indicating-scales, one series being in a stationary position and arranged at one end of the table, the other series being movable both lengthwise and crosswise the fixed series, and a product-finder carried by the movable series, each series comprising two or more independent scales adapted to be independently used and whereby different results are obtained from the use of the same table.

5. In a computing device the combination of a table of computations arranged in regular order in lines and columns, two sets of main indicating-scales, one of which sets is at a right angle to the other and movable with respect to the other, a product-finder movable over said table to a position determined by the movement of one of each set of said sets of indicating-scales and which position indicates in the table the product of two predetermined measurements, or a multiple thereof, two auxiliary tables prepared from said table of computations, a movable product-finder for each auxiliary table and auxiliary scales for each auxiliary finder one for each of the main scales.

6. In a computing device the combination of a table of computations arranged in regular order in lines and columns, a stationary main scale at one side of said table, a slide movable lengthwise said main scale and a pointer mounted thereon, a cross-slide mounted upon said first-named slide to be movable across the main scale at a right angle thereto and over the table, a main scale carried by said slide to be movable therewith, a product-finder carried by said slide and a stationary pointer to coöperate with the scale carried by said slide.

7. In a computing device the combination of a table of computations arranged in lines and columns, a stationary main indicating-scale, a slide movable lengthwise the stationary scale, a pointer on said slide, a slide carried by said first-named slide and movable therein at right angles to its path of movement, a main scale carried thereby, a product-finder also carried thereby, a pointer to coöperate with said second main scale, a bed attached to the first-named slide to be movable therewith, an auxiliary table mounted on said bed, an auxiliary scale mounted upon said first-named slide to be movable lengthwise it and an auxiliary product-finder movable over said auxiliary table and connected with the cross-slide to be actuated therewith, a bed attached to the cross-slide to be movable by it across the main computing-table, an auxiliary table mounted thereon, an auxiliary scale also mounted thereon, a product-finder independently movable across said last-named auxiliary table, having a pointer to coöperate with said last-named scale.

8. In a computing device the combination of a table of computations arranged in order in lines and columns, a product-finder and scales by which it is adapted to be set, an auxiliary table movable up and down the table with the product-finder and connected with the product-finder or its slide to permit the lateral movement of one with respect to the other, an auxiliary table movable crosswise the main table by the product-finder or its slide and connected therewith in a manner to permit the product-finder to be movable lengthwise the same, an auxiliary product-finder for each auxiliary table and scales for governing the position of the same.

9. In a computing device the combination of a table of computations arranged in lines and columns, a movable product-finder and two or more sets of scales for governing its use, one set being arranged at a right angle to the other and movable with respect to the other and each additional scale of each set having its indicators of a different or multiplied arrangement as regards the first set, whereby the measuring capacity of the table is increased by multiplying its products to correspond to the multiplied scales.

10. In a computing device the combination of a table of computations arranged in lines and columns, a movable product-finder, rotary scale-supports and scales of different arrangements mounted upon the surfaces of said supports.

11. The combination in a computing device of a table of computations arranged in lines and columns, an auxiliary table movable lengthwise the first-named table, a second auxiliary table movable crosswise the first table and the first auxiliary table, independent product-finders for the main table and for each of the auxiliary tables and a series of main and auxiliary scales having different values for determining the position to which the product-finders shall be moved.

12. In a computing device the combination of a table of computations, arranged in regular order in lines and columns, two series of independent, main, indicating-scales, one series being arranged at one end of the table, and the other series being movable both lengthwise and crosswise it and the table, each series comprising two or more independent scales, adapted to be independently used, and a single product-finder, common to all the scales of the movable series, and movable with them, as and for the purposes set forth.

WALTER S. SMITH.

Witnesses:
F. F. RAYMOND, 2d,
J. M. DOLAN.